United States Patent
Kim et al.

(10) Patent No.: US 10,059,597 B2
(45) Date of Patent: Aug. 28, 2018

(54) METHOD AND APPARATUS FOR MANUFACTURING AEROGEL SHEET

(71) Applicant: LG CHEM, LTD., Seoul (KR)

(72) Inventors: Ye Hon Kim, Daejeon (KR); Je Kyun Lee, Daejeon (KR); Jung Uk Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/564,641

(22) PCT Filed: Oct. 31, 2016

(86) PCT No.: PCT/KR2016/012405
§ 371 (c)(1),
(2) Date: Oct. 5, 2017

(87) PCT Pub. No.: WO2017/126785
PCT Pub. Date: Jul. 27, 2017

(65) Prior Publication Data
US 2018/0072578 A1    Mar. 15, 2018

(30) Foreign Application Priority Data
Jan. 19, 2016 (KR) .......................... 10-2016-0006339

(51) Int. Cl.
| | |
|---|---|
| C01B 33/149 | (2006.01) |
| B05D 1/18 | (2006.01) |
| C01B 33/158 | (2006.01) |
| C01B 33/159 | (2006.01) |
| B05D 3/10 | (2006.01) |

(52) U.S. Cl.
CPC .............. *C01B 33/149* (2013.01); *B05D 1/18* (2013.01); *B05D 3/107* (2013.01); *C01B 33/159* (2013.01); *C01B 33/1585* (2013.01)

(58) Field of Classification Search
None
See application file for complete search history.

(56) References Cited

U.S. PATENT DOCUMENTS

| | | | |
|---|---|---|---|
| 2005/0046086 A1 | 3/2005 | Lee et al. | |
| 2005/0167891 A1 | 8/2005 | Lee et al. | |
| 2005/0192366 A1* | 9/2005 | Ou | C01B 33/158 521/64 |
| 2005/0192367 A1* | 9/2005 | Ou | C01B 33/155 521/64 |
| 2006/0084707 A1* | 4/2006 | Ou | C01B 33/1585 516/78 |
| 2008/0093016 A1 | 4/2008 | Lee et al. | |

(Continued)

FOREIGN PATENT DOCUMENTS

| | | |
|---|---|---|
| CN | 1839024 | 9/2006 |
| CN | 103102135 | 5/2013 |

(Continued)

*Primary Examiner* — Erma C Cameron
(74) *Attorney, Agent, or Firm* — Dentons US LLP

(57) ABSTRACT

The present invention relates to a method for manufacturing an aerogel sheet. The method for manufacturing an aerogel sheet includes: a step (a) of immersing a blanket in an impregnation vessel in which silica sol is stored to impregnate the silica sol; and a step (b) of injecting a gelling catalyst to a surface of the blanket in which the silica sol is impregnated to gelate the silica sol.

15 Claims, 3 Drawing Sheets

(56) References Cited

U.S. PATENT DOCUMENTS

| | | | | |
|---|---|---|---|---|
| 2010/0155644 A1* | 6/2010 | Ou | ................... | C01B 33/155 252/62 |
| 2016/0046495 A1 | 2/2016 | Xiang | | |
| 2016/0258153 A1* | 9/2016 | Koebel | ............... | C01B 33/145 |
| 2018/0001576 A1* | 1/2018 | Koebel | ............... | B29C 67/202 |

FOREIGN PATENT DOCUMENTS

| | | |
|---|---|---|
| CN | 103496706 | 1/2014 |
| EP | 2813338 A1 | 12/2014 |
| JP | 2011190136 A | 9/2011 |
| KR | 10-2011-0082379 A | 7/2011 |
| KR | 10-2011-0126381 | 11/2011 |
| KR | 10-2011-0126381 A | 11/2011 |
| KR | 10-1105436 B1 | 1/2012 |
| KR | 10-1199958 | 11/2012 |
| KR | 10-1199958 B1 | 11/2012 |
| KR | 10-2015-0089319 | 8/2015 |
| KR | 10-2015-0089319 A | 8/2015 |
| KR | 10-2015-0090320 A | 8/2015 |
| KR | 10-1774140 | 9/2017 |
| WO | 2015175970 A1 | 11/2015 |

\* cited by examiner

METHOD AND APPARATUS FOR MANUFACTURING AEROGEL SHEET

CROSS-REFERENCE TO RELATED APPLICATION

This application is a National Stage Entry of International Application No. PCT/KR 2016/012405, filed Oct. 31, 2016, and claims the benefit of and priority to Korean Application No. 10-2016-0006339, filed on Jan. 19, 2016, all of which are hereby incorporated by reference in their entirety for all purposes as if fully set forth herein.

TECHNICAL FIELD

The present invention relates to a method and apparatus for manufacturing an aerogel sheet, and more particularly, to a method and apparatus for manufacturing an aerogel sheet having excellent heat insulation and durability and having a uniform thickness.

BACKGROUND ART

In general, aerogel is a high porosity material having high porosity of about 90% to about 99% in solids that are known up to date. A silica precursor solution is subjected to sol-gel polymerization reaction to from gel, and then, drying process is performed on the formed gel under supercritical or atmospheric conditions to obtain the aerogel. That is, aerogel has a pore structure filled with air.

The above-described aerogel is lightweight and has physical properties such as heat insulation and sound absorption due to the unique pore structure in which 90% to 99% of an internal space is empty. The greatest advantage of the above-described advantages is the high heat insulation having thermal conductivity of 30 mW/m.k or less, which is significantly lower than thermal conductivity of 36 mW/m.k that is thermal conductivity of an organic insulation material such as conventional Styrofoam and the like.

DISCLOSURE OF THE INVENTION

Technical Problem

There are problems that the aerogel sheet has nonuniform thickness and poor heat insulation and durability.

The present invention has been made to solve the above-mentioned problems, and an object of the prevent invention is to provide a method and apparatus for manufacturing an aerogel sheet having excellent heat insulation and durability and having a uniform thickness.

Technical Solution

To achieve the above-described object, a method for manufacturing an aerogel sheet according to the present invention includes: a step (a) of immersing a blanket in an impregnation vessel in which silica sol is stored to impregnate the silica sol; and a step (b) of injecting a gelling catalyst to a surface of the blanket in which the silica sol is impregnated to gelate the silica sol.

In the step (a), tetraethyl orthosilicate (TEOS) and ethanol may be mixed to prepare the silica sol.

The tetraethyl orthosilicate (TEOS) may include hydrolyzed TEOS.

In the step (b), ethanol and ammonia water ($NH_4OH$) may be mixed to prepare the gelling catalyst.

The step (b) may be performed within a conveyor belt that transfers the blanket, on which the step (a) is performed, from one side to the other side thereof.

The conveyor belt may include a scraper including a first scraper adjusting a thickness of the silica sol impregnated to the surface of the blanket and a second scraper adjusting a thickness of the gelling catalyst injected to the surface of the blanket.

In the step (b), the gelling catalyst may be injected to the surface of the blanket 10 at a rate of 0.035 L/min to 0.012 L/min to leave the gelling catalyst for a time of 8 minutes to 12 minutes and thereby to gelate the silica sol.

After the step (b), the method may further include a step (c) of aging the blanket in which the silica sol is gelated.

In the step (c), the blanket in which the silica sol is gelated may be aged at a temperature of 70° C. and aged for 50 minutes.

In the step (c), the blanket in which the silica sol is gelated may be left at room temperature for 10 minutes to perform the aging.

After the step (c), the method may further include a step (d) of injecting an additional aging and coating solution to the aged blanket to modify a surface of the blanket.

In the step (d), the additional aging solution may be prepared by mixing ethanol with ammonia water ($NH_4OH$).

In the step (d), the surface modification solution may be prepared by mixing ethanol with hexamethyldisilazane (HMDS). The surface modification solution may be injected with 1.6 times of the silica sol impregnated into the surface of the blanket, and the aging may be performed at a high temperature of 70° C. for one hour in a reaction vessel to modify the surface of the sheet.

After the step (d), the method may further include a step (e) of drying the blanket of which the surface is modified.

The step (e) may include a first drying step of injecting carbon dioxide at a rate of 70 L/min for ten minutes under environments of a temperature of 28° C. and a pressure of 70 bar to dry the blanket of which the surface is modified, a second drying step of raising to a temperature of 50° C. for 1 hour and 20 minutes to dry the blanket, a third drying step of injecting carbon dioxide at a rate of 0.7 L/min for 20 minutes under a temperature of 50° C. and a pressure of 150 bar to dry the blanket again, and a fourth drying step of injecting carbon dioxide at a rate of 0.7 L/min for 20 minutes after breaking for 20 minutes to dry the blanket.

In the third drying step of the step (e), the ethanol generated from the blanket of which the surface is modified may be collected while injecting the carbon dioxide.

The step (e) may further include a step of discharging the carbon dioxide for 2 hours after the fourth drying step.

The steps (c), (d), and (e) may be performed in a reaction vessel accommodating the blanket.

In the step (e), the blanket may undergo supercritical drying in the state of being accommodated in the reaction vessel.

An apparatus of manufacturing an aerogel sheet includes: a supply roller around which a blanket is wound in the form of roll; an impregnation vessel in which the blanket wound around the supply roller is immersed in stored silica sol to impregnate silica sol; a conveyor belt transferring the blanket passing through the impregnation vessel from one side to the other side thereof; a catalyst supply member injecting a stored gelling catalyst to a surface of the blanket disposed on the conveyor belt to gelate the silica sol; a collection roller winding the blanket, which is transferred up to the other side by the conveyor belt, in the form of the roll to collect the blanket; and a reaction vessel which accommodates the blanket collected by the collection roller and in which the accommodated blanket is aged, surface-modified by injecting a coating solution, or dried at a high temperature.

Advantageous Effects

The present invention has effects as follows.

First: the present invention may use the method for manufacturing the aerogel sheet to manufacture the aerogel sheet having the superior insulation and durability, particularly, having the uniform thickness.

Second: in the method for manufacturing the aerogel sheet according to the present invention, the tetraethyl orthosilicate (TEOS) and the ethanol may be mixed to obtain the silica sol having the high quality.

Third: in the method for manufacturing the aerogel sheet according to the present invention, the hydrolyzed TEOS may be used to obtain the silica sol having the high quality.

Fourth: in the method for manufacturing the aerogel sheet according to the present invention, the ethanol and the ammonia water ($NH_4OH$) may be mixed to obtain the gelling catalyst having the high quality.

Fifth: in the method for manufacturing the aerogel sheet according to the present invention, the conveyor belt for transferring the blanket from one side to the other side thereof may be used to achieve the continuity of the operation and the simplification of the process.

Sixth: in the method for manufacturing the aerogel sheet according to the present invention, the scraper may be provided on the conveyor belt to uniformly adjust the thickness of the silica sol or the gelling catalyst.

Seventh: in the method for manufacturing the aerogel sheet according to the present invention, the blanket in which the silica sol is gelated may be aged and then dried after the surface modification to obtain the aerogel sheet having the high quality.

MODE FOR CARRYING OUT THE INVENTION

Figure 1:
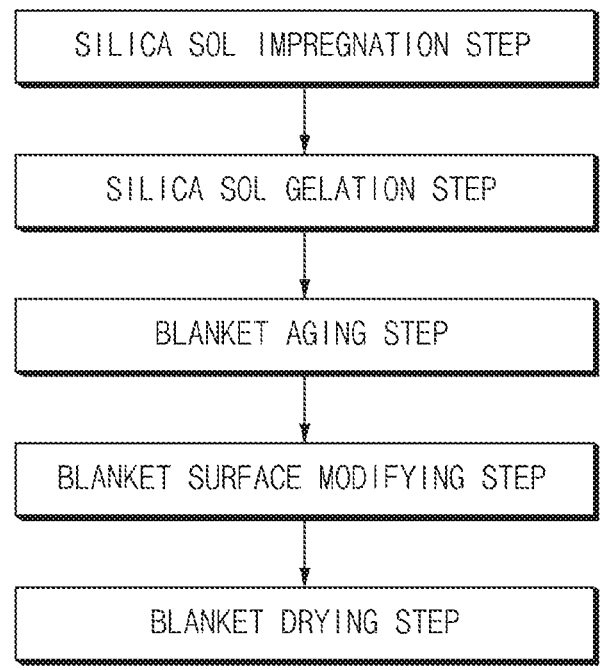
FIG. 1 is a flowchart illustrating a method for manufacturing an aerogel sheet according to the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

A method for manufacturing an aerogel sheet according to the present invention includes, as illustrated in FIG. 1, a silica sol impregnation step (a) of impregnating silica sol into a blanket, a silica sol gelation step (b) of injecting a gelling catalyst to the blanket to gelate the silica sol, a blanket aging step (c) of aging the blanket in which the silica sol is gelated, a blanket surface modification step (d) of injecting a coating solution to the aged blanket to modify a surface of the blanket, and a blanket drying step (e) of drying the blanket of which the surface is modified.

Hereinafter, the method for manufacturing the aerogel sheet according to the present invention will be described in more detail.

Figure 2:
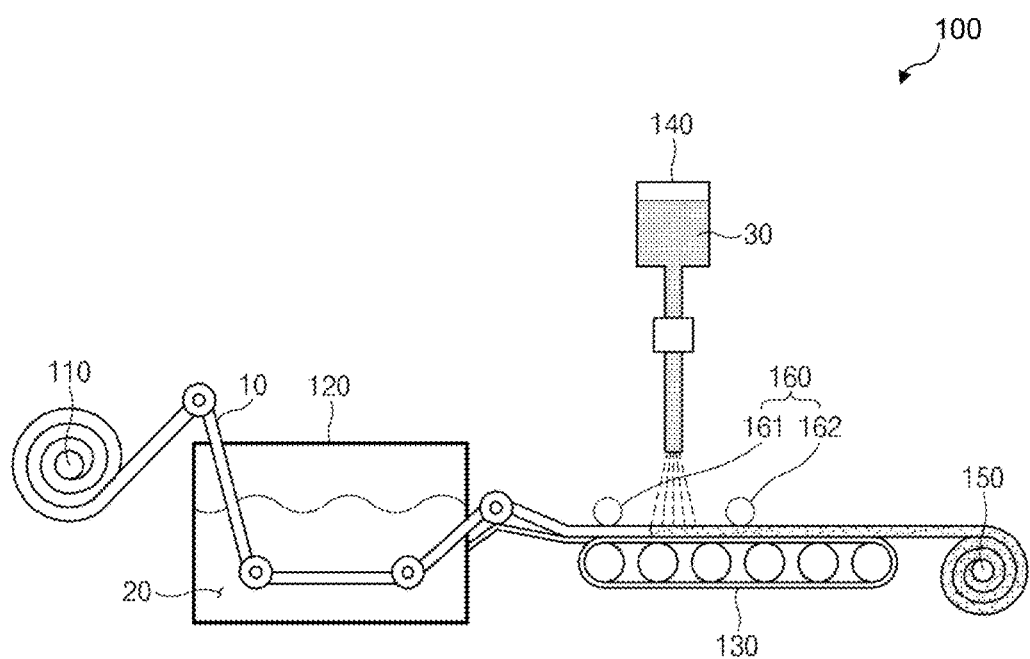
FIG. 2 is a view illustrating an apparatus of manufacturing the aerogel sheet according to the present invention.

FIG. 2 is a view of an apparatus 100 of manufacturing the aerogel sheet, in which the silica sol impregnation step (a) and the silica sol gelation step (b) are performed according to the present invention.

That is, as illustrated in FIG. 2, the apparatus 100 of manufacturing the aerogel sheet includes a supply roller 110 around which a blanket 10 is wound in the form of roll, an impregnation vessel 120 in which the blanket 10 wound around the supply roller 110 is immersed in the silica sol to impregnate the silica sol therein, a conveyor belt 130 for transferring the blanket 10 passing through the impregnation vessel 120 from one side to the other side thereof, a catalyst supply member 140 for injecting a gelling catalyst 30 to a surface of the blanket 10 disposed on the conveyor belt 130 to gelate the silica sol, and a collection roller 150 winding the blanket 10 transferred to the outside side by the conveyor belt 130 in a roll shape to collect the blanket 10.

Explaining a use state of the apparatus 100 of manufacturing the aerogel sheet, the blanket 10 wound around the supply roller 110 passes through the impregnation vessel 120 to impregnate the silica sol 20, and the blanket 10 in which the silica sol 20 is impregnated is transferred by the conveyor belt 130. Then, the gelling catalyst is injected to the surface of the blanket 10 transferred by the conveyor belt 130 through the catalyst supply member 140 to gelate the silica sol 20. Also, the blanket 10 passing through the conveyor belt 130 is wound around the collection roller 150 and thus collected.

Here, a scraper 160 for uniformly adjusting a thickness of each of the silica sol 20 injected to the blanket 10 and the gelling catalyst 30 may be provided on the conveyor belt 120. The scraper 160 includes a first scraper 161 uniformly adjusting a thickness of the silica sol 20 injected to the surface of the blanket 10 and a second scraper 162 uniformly adjusting a thickness of the gelling catalyst 30 injected to the surface of the blanket 10.

Hereinafter, the silica sol impregnation step (a) and the silica sol gelling step (d) through the apparatus 100 of manufacturing the aerogel sheet will be described in more detail.

(a) Silica Sol Impregnation Step

In the silica sol impregnation step (a), the blanket 10 is immersed in the impregnation vessel 120 in which the silica sol is stored to impregnate the silica sol 20 into the surface of the blanket 10. That is, in the silica sol impregnation step (a), a front end of the blanket 10 wound around the supply roller 110 in the roll shape gradually moves to pass through the inside of the impregnation vessel 120 in which the silica sol 20 is accommodated. Here, the blanket 10 may pass through the impregnation vessel 120 after completely immersed in the silica sol 20. Thus, the silica sol 20 may be stably impregnated into the surface of the blanket 10.

Here, the silica sol 20 may be prepared by mixing tetraethyl orthosilicate (TEOS) with ethanol. That is, 1.2 kg of TEOS and 2.7 kg of ethanol are provided in a reaction bath (not shown) to prepare the silica sol.

A hydrolyzed solvent having high reactivity with water may be used as the TEOS to improve reactivity. That is, the hydrolyzed TEOS and the ethanol may be mixed to obtain the silica sol having excellent reactivity.

(b) Silica Sol Gelation Step

In the silica sol gelation step (b), the gelling catalyst is injected to the surface of the blanket 10 transferred by the conveyor belt 130 to gelate the silica sol. Here, the gelling catalyst is prepared by mixing ethanol with ammonia water ($NH_4OH$). That is, 0.5 kg of ethanol and 30 ml of ammonia water ($NH_4OH$) are mixed in the reaction bath (not shown) to prepare the gelling catalyst.

Thus, in the silica sol gelation step (b), the prepared gelling catalyst 30 is injected into and stored in the catalyst supply member 140. Then, when the blanket 10 into which the silica sol is impregnated is transferred up to a lower side of the catalyst supply member 140 by the conveyor belt 130, the gelling catalyst 30 is injected to the surface of the blanket 10 through the catalyst supply member 140 to gelate the silica sol.

Here, the catalyst supply member 140 may inject the stored gelling catalyst 30 at a preset rate to leave the gelling catalyst for a preset time and thereby gelate the silica sol. That is, the catalyst supply member 140 may inject the gelling catalyst 30 to the surface of the blanket 10 at a rate of 0.035 L/min to 0.012 L/min and then leave the gelling catalyst 30 for a time of 8 minutes to 12 minutes to gelate the silica sol.

Particularly, as illustrated in FIG. 2, the catalyst supply member 140 may uniformly adjust the gelation of the silica sol by varying the injection rate of the gelling catalyst 30 according to density of the silica sol 20 impregnated in the blanket 10. That is, the more the density of the silica sol increases, the more the injection rate of the gelling catalyst 30 decreases to induce stable gelation of the silica sol.

The blanket 10 in which the silica sol is gelated is collected while being wound in the roll shape by the collection roller 150, and the collected blanket 10 undergoes the aging step, the surface modification step, and the drying step to complete the aerogel sheet. Here, a reaction vessel 170 is used.

Figure 3:
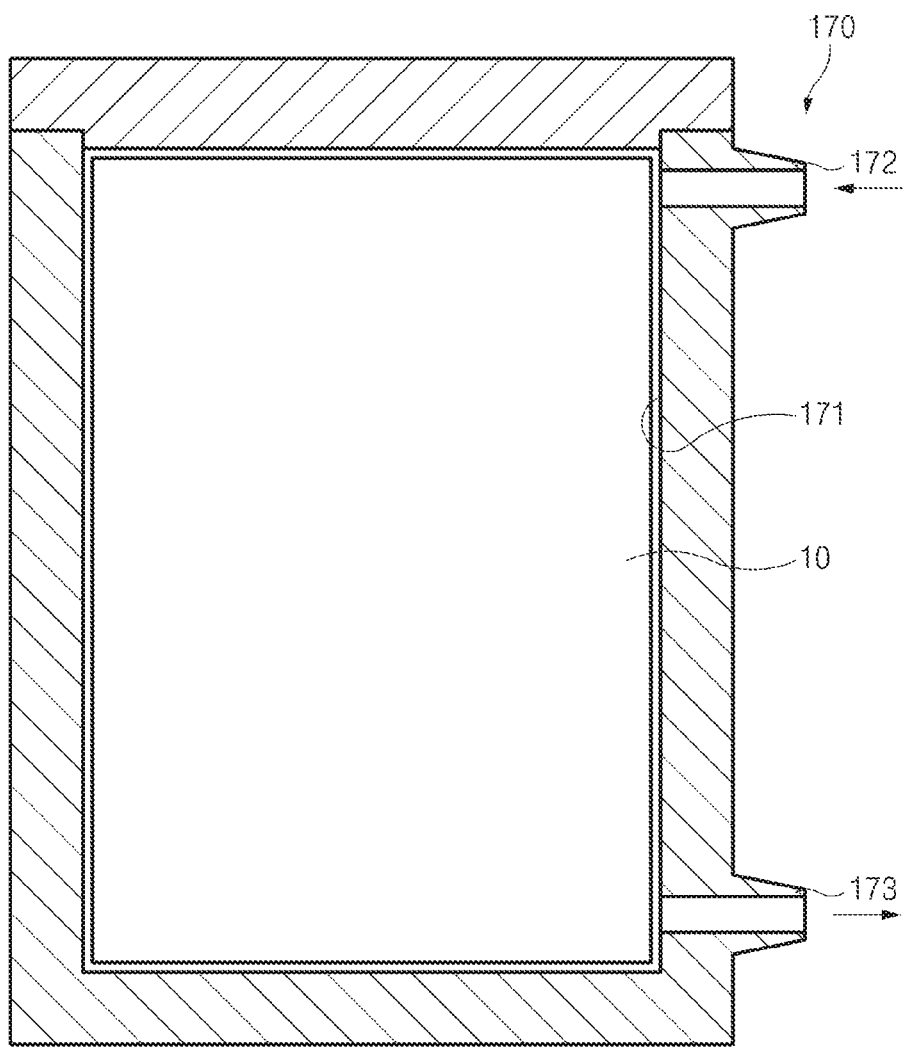
FIG. 3 is a view of a reaction vessel provided in the apparatus for manufacturing the aerogel sheet according to the present invention.

FIG. 3 is a view of a reaction vessel 170 according to the present invention.

That is, the reaction vessel 170 has an accommodation space 171 in which the blanket 10 collected in the roll shape is accommodated to be sealed, an injection hole 172 having one end connected to the accommodation space 171, and a discharge hole 173 having the other end connected to the accommodation space 171.

Hereinafter, the blanket aging step (c), the blanket surface modification step (d), and the blanket drying step (e) using the reaction vessel 170 will be described.

(c) Blanket Aging Step

In the blanket aging step (c), the blanket in which the silica sol is gelated is aged. That is, the blanket 10 prepared in the step (b) is accommodated in the accommodation space 171 of the reaction vessel 170, and then, the reaction vessel 170 is aged for 50 minutes in a state of being heated up to a temperature of 70° C. to uniformize tissues of the blanket 10.

Here, in the blanket aging step (c), the blanket is left at room temperature (or a temperature of 25° C.) for 10 minutes before the aging is performed in the reaction vessel 170. That is, in the blanket aging step (c), the blanket 10 is left for 10 minutes to induce stable gelation of the silica sol and perform the aging and thereby to more uniformize the tissues of the blanket 10.

(d) Blanket Surface Modification Step

In the blanket surface modification step (d), a coating solution is injected to the aged blanket to modify a surface of the blanket. That is, in the blanket surface modification step (d), ethanol and ammonia water ($NH_4OH$) are mixed to prepare the coating solution. Then, as shown in FIG. 3, the coating solution is injected into the accommodation space 171 through the injection hole 172 of the reaction vessel 170 in which the blanket 10 is loaded to modify a surface of the blanket 10. Here, the coating solution is injected with 1.6 times of the silica sol impregnated into the surface of the blanket in the step (a), and the aging is performed at a high temperature of 70° C. for one hour in the reaction vessel 170 to modify the surface of the blanket 10 by using hexamethyldisilazane (HMDS).

(e) Blanket Drying Step

In the blanket drying step (e), the blanket 10 of which the surface is modified is dried to complete a silica gel sheet. Here, in the blanket drying step (e), supercritical drying is performed in the state in which the blanket 10 is accommodated in the reaction vessel 170. That is, the blanket drying step (e) includes a first drying step of injecting carbon dioxide at a rate of 70 L/min for ten minutes under environments of a temperature of 28° C. and a pressure of 70 bar to dry the blanket 10, a second drying step of raising to a temperature of 50° C. for 1 hour and 20 minutes to dry the blanket 10, a third drying step of injecting carbon dioxide at a rate of 0.7 L/min for 20 minutes again under a temperature of 50° C. and a pressure of 150 bar to dry the blanket 10, and a fourth drying step of injecting carbon dioxide at a rate of 0.7 L/min for 20 minutes after breaking for 20 minutes to dry the blanket 10. The drying step as described above may be performed to improve a dryness factor of the blanket 10.

In the third drying step of the blanket drying step (e), ethanol is generated in the reaction vessel 170 by chemical reaction between carbon dioxide and the blanket 10, and the ethanol generated in the reaction vessel 170 is discharged through the discharge hole 173 and then is collected.

Also, the blanket drying step (e) includes a discharging step of discharging the carbon dioxide for 2 hours after the fourth drying step. Thus, a gradual environmental change is inducted in the blanket 10 to uniformize the tissues of the blanket 10.

The aerogel sheet may be manufactured through the method for manufacturing the aerogel sheet according to the present invention to uniformize the tissues and improve the heat insulation and durability, particularly, provide the uniform thickness.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for manufacturing an aerogel sheet, the method comprising:
   a step (a) of immersing a blanket in an impregnation vessel in which a silica sol is stored to impregnate the blanket with the silica sol; and
   a step (b) of injecting a gelling catalyst prepared by mixing 0.5 kg ethanol and 30 mL ammonia water ($NH_4OH$) to a surface of the blanket in which the silica sol is impregnated to gelate the silica sol,
   wherein the step (b) and the step (a) are performed within a conveyor belt that transfers the blanket from one side to the other side thereof,
   wherein the conveyor belt comprises a scraper comprising a first scraper adjusting a thickness of the silica sol on the surface of the blanket and a second scraper adjusting a thickness of the gelling catalyst injected to the surface of the blanket, wherein, in the step (b), the gelling catalyst is injected to the surface of the blanket at a rate of 0.035 L/min to 0.012 L/min to leave the gelling catalyst for 8 minutes to 12 minutes and thereby to gelate the silica sol, and wherein a catalyst supply member adjusts the gelation of the silica sol by varying the injection rate of the gelling catalyst according to density of the silica sol impregnated in the blanket.

2. The method of claim 1, wherein, in the step (a), tetraethyl orthosilicate (TEOS) and ethanol are mixed to prepare the silica sol.

3. The method of claim 2, wherein the tetraethyl orthosilicate (TEOS) comprises hydrolyzed TEOS.

4. The method of claim 1, after the step (b), further comprising a step (c) of aging the blanket in which the silica sol is gelated.

5. The method of claim 4, wherein, in the step (c), the blanket in which the silica sol is gelated is aged at a temperature of 70° C. and aged for 50 minutes.

6. The method of claim 4, wherein, in the step (c), the blanket in which the silica sol is gelated is left at room temperature for 10 minutes to perform the aging.

7. The method of claim 4, after the step (c), further comprising a step (d) of injecting a surface modification solution to the surface of the aged blanket and reacting at a temperature of 70° C. for one hour in a reaction vessel to modify a surface of the blanket.

8. The method of claim 7, wherein, in the step (d), the surface modification solution comprises hexamethyldisilazane (HMDS).

9. The method of claim 7, after the step (d), further comprising a step (e) of drying the blanket of which the surface is modified.

10. The method of claim 9, wherein the step (e) comprises a first drying step of injecting carbon dioxide at a rate of 70 L/min for ten minutes under environments of a temperature of 28° C. and a pressure of 70 bar to dry the blanket of which the surface is modified, a second drying step of raising to a temperature of 50° C. for 1 hour and 20 minutes to dry the blanket, a third drying step of injecting carbon dioxide at a rate of 0.7 L/min for 20 minutes under a temperature of 50° C. and a pressure of 150 bar to dry the blanket again, waiting for 20 minutes, and a fourth drying step of injecting carbon dioxide at a rate of 0.7 L/min for 20 minutes to dry the blanket.

11. The method of claim 10, wherein, in the third drying step of the step (e), the ethanol generated from the blanket of which the surface is modified is collected while injecting the carbon dioxide.

12. The method of claim 10, wherein the step (e) further comprises a step of discharging the carbon dioxide for 2 hours after the fourth drying step.

13. The method of claim 12, wherein the steps (c), (d), and (e) are performed in a reaction vessel accommodating the blanket.

14. The method of claim 13, wherein, in the step (e), the blanket undergoes supercritical drying in the state of being accommodated in the reaction vessel.

15. An apparatus of manufacturing an aerogel sheet, the apparatus comprising:

a supply roller around which a blanket is wound in the form of roll;

an impregnation vessel in which the blanket wound around the supply roller is immersed in stored silica sol to impregnate silica sol;

a conveyor belt transferring the blanket passing through the impregnation vessel from one side to the other side thereof;

a catalyst supply member injecting a stored gelling catalyst to a surface of the blanket disposed on the conveyor belt to gelate the silica sol;

a collection roller winding the blanket, which is transferred up to the other side by the conveyor belt, in the form of the roll to collect the blanket; and a reaction vessel which accommodates the blanket collected by the collection roller and in which the accommodated blanket is aged, surface-modified by injecting a surface modification solution, or dried at a temperature from 28° C. to 50° C., wherein the conveyor belt comprises a scraper comprising a first scraper adjusting a thickness of the silica sol on the surface of the blanket and a second scraper adjusting a thickness of the gelling catalyst injected to the surface of the blanket, wherein the gelling catalyst prepared by mixing 0.5 kg ethanol and 30 mL ammonia water ($NH_4OH$) is injected to the surface of the blanket at a rate of 0.035 L/min to 0.012 L/min to leave the gelling catalyst for 8 minutes to 12 minutes to thereby gelate the silica sol, and wherein the catalyst supply member adjusts the gelation of the silica sol by varying the injection rate of the gelling catalyst according to density of the silica sol impregnated in the blanket.

* * * * *